(12) United States Patent
Adachi et al.

(10) Patent No.: US 10,470,179 B2
(45) Date of Patent: Nov. 5, 2019

(54) RADIO COMMUNICATION METHODS AND RADIO COMMUNICATION DEVICES

(71) Applicant: AGENCY FOR SCIENCE, TECHNOLOGY AND RESEARCH, Singapore (SG)

(72) Inventors: Koichi Adachi, Singapore (SG); Jin Gon Joung, Singapore (SG); Yuan Zhou, Singapore (SG); Sumei Sun, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 84 days.

(21) Appl. No.: 15/553,157

(22) PCT Filed: Feb. 23, 2016

(86) PCT No.: PCT/SG2016/050087
§ 371 (c)(1),
(2) Date: Aug. 23, 2017

(87) PCT Pub. No.: WO2016/137395
PCT Pub. Date: Sep. 1, 2016

(65) Prior Publication Data
US 2018/0077704 A1    Mar. 15, 2018

(30) Foreign Application Priority Data
Feb. 23, 2015   (SG) .......................... 10201501312X

(51) Int. Cl.
*H04W 72/04* (2009.01)
*H04W 72/10* (2009.01)
(Continued)

(52) U.S. Cl.
CPC ... *H04W 72/0446* (2013.01); *H04W 36/0055* (2013.01); *H04W 72/0486* (2013.01);
(Continued)

(58) Field of Classification Search
CPC . H04W 16/10; H04W 36/0055; H04W 36/04; H04W 36/20; H04W 72/0446;
(Continued)

(56) References Cited

U.S. PATENT DOCUMENTS

| 9,538,396 B2 * | 1/2017 | Seo ................... H04W 36/0083 |
| 2010/0015984 A1 * | 1/2010 | Kazmi ............. H04W 36/0088 455/437 |

(Continued)

FOREIGN PATENT DOCUMENTS

| WO | WO 2013/063604 A2 | 5/2013 |
| WO | WO 2014/036699 A1 | 3/2014 |

OTHER PUBLICATIONS

PCT Notification of Transmittal of International Preliminary Report on Patentability for PCT Application No. PCT/SG2016/050087, 7 pgs. (dated Sep. 8, 2017).
(Continued)

*Primary Examiner* — Robert J Lopata
(74) *Attorney, Agent, or Firm* — Womble Bond Dickinson (US) LLP

(57) ABSTRACT

According to various embodiments, a radio communication method may be provided. The radio communication method may include: determining in a cell at least one first subframe; determining in the cell at least one second subframe; allocating downlink user traffic in the cell during the first subframe with a low priority; and transmitting a handover command to a user equipment based on the second subframe.

18 Claims, 12 Drawing Sheets

(51) Int. Cl.
*H04W 36/00* (2009.01)
*H04W 16/10* (2009.01)
*H04W 36/04* (2009.01)
*H04W 36/20* (2009.01)

(52) U.S. Cl.
CPC ............ *H04W 72/10* (2013.01); *H04W 16/10* (2013.01); *H04W 36/04* (2013.01); *H04W 36/20* (2013.01)

(58) Field of Classification Search
CPC . H04W 72/0486; H04W 72/10; H04W 36/00; H04W 36/0005; H04W 36/0007; H04W 36/0009; H04W 36/0016; H04W 36/03
USPC ......................................................... 370/331
See application file for complete search history.

(56) References Cited

U.S. PATENT DOCUMENTS

| | | | | |
|---|---|---|---|---|
| 2010/0254351 | A1* | 10/2010 | Wang | H04J 11/0069 370/332 |
| 2013/0084864 | A1 | 4/2013 | Agrawal et al. | |
| 2013/0210422 | A1* | 8/2013 | Pani | H04W 48/16 455/423 |
| 2013/0223409 | A1* | 8/2013 | Jung | H04W 36/20 370/331 |
| 2014/0003250 | A1* | 1/2014 | Seo | H04W 36/0083 370/241 |
| 2015/0011218 | A1* | 1/2015 | Lunden | H04W 40/16 455/436 |
| 2015/0124733 | A1* | 5/2015 | Lim | H04W 52/244 370/329 |
| 2015/0249938 | A1* | 9/2015 | Dudda | H04W 36/0055 370/331 |
| 2016/0174124 | A1* | 6/2016 | Basu Mallick | H04W 36/0072 370/331 |
| 2016/0373990 | A1* | 12/2016 | Lim | H04W 48/16 |
| 2017/0171787 | A1* | 6/2017 | Fu | H04W 36/0072 |

OTHER PUBLICATIONS

PCT International Search Report for PCT Counterpart Application No. PCT/SG2016/050087, 5 pgs. (dated Apr. 20, 2016).
PCT Written Opinion for PCT Counterpart Application No. PCT/SG2016/050087, 5 pgs. (dated Apr. 20. 2016).
Lars Lindbom, et al., "Enhanced Inter-cell Interference Coordination for Heterogeneous Networks in LTE-Advanced: A Survey," The Computing Research Repository (CoRR) abs/1112.1344, [Retrieved on Apr. 11, 2016 from http://ARXIV.ORG/ABS/1112.1344], 18 pages (Dec. 7, 2011).
Stepan Kucera, et al., "Orthogonally-Filled Subframes for Optimum Operation of Co-Channel LTE HetNets," 2014 IEEE International Conference on Communications (ICC), pp. 4868-4874 (Jun. 14, 2014).

* cited by examiner

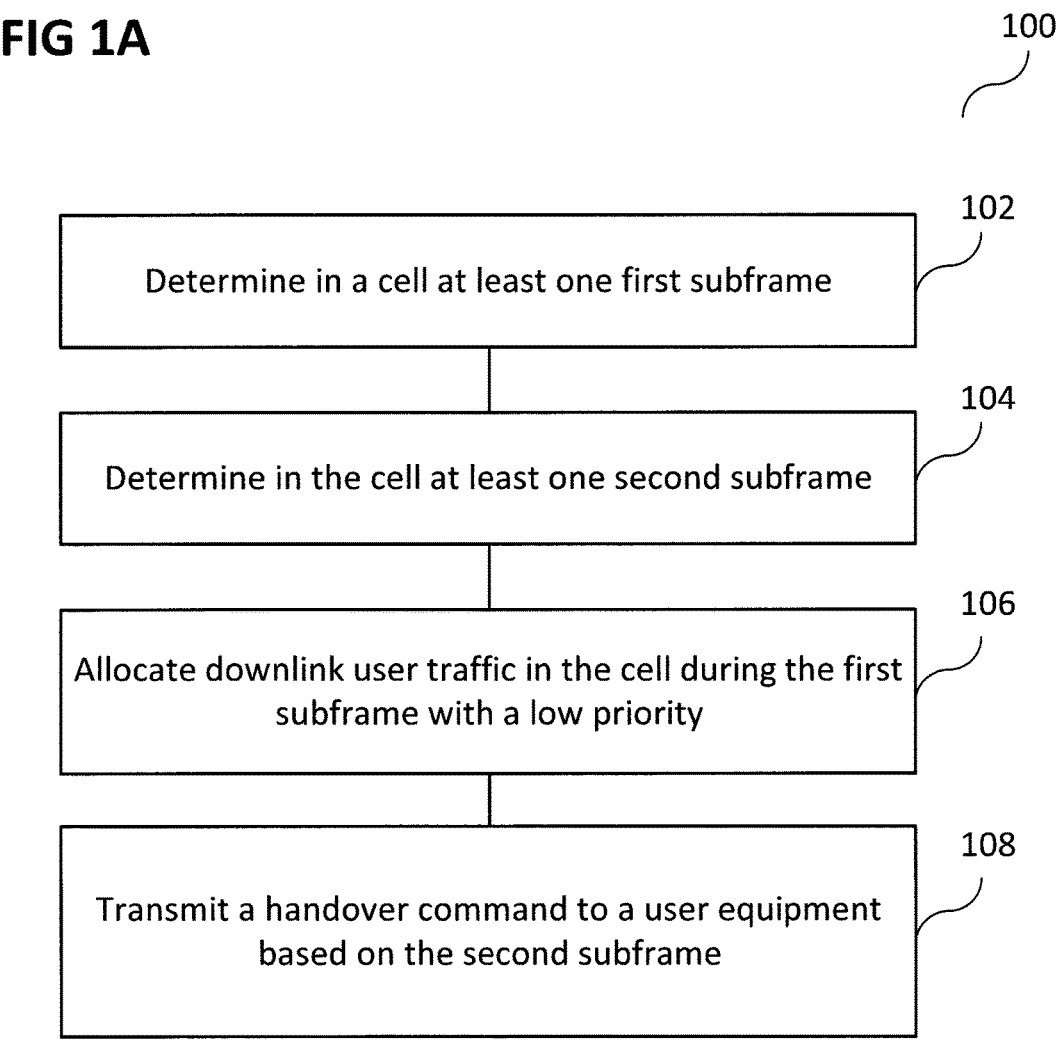

US 10,470,179 B2

RADIO COMMUNICATION METHODS AND RADIO COMMUNICATION DEVICES

CROSS-REFERENCE TO RELATED APPLICATIONS

This patent application is a U.S. National Phase Application under 35 U.S.C. § 371 of International Application No. PCT/SG2016/050087, filed on 23 Feb. 2016, entitled RADIO COMMUNICATION METHODS AND RADIO COMMUNICATION DEVICES, claims priority to Singapore patent application No. 10201501312X filed on 23 Feb. 2015, the entire contents of which were incorporated herein by reference for all purposes.

TECHNICAL FIELD

Embodiments relate generally to radio communication methods and radio communication devices.

BACKGROUND

Discontinuity among the different networks arises as a severe issue in HetNet. To support the interoperability among the networks, seamless connectivity may be a key challenge and it is desired to be realized to achieve the full benefit of the HetNet. When a UE is moving out from the coverage area of a currently connecting cell (which may be referred to as serving cell), the UE may need to detach from the serving cell and reattach to another cell (which may be referred to as target cell). This procedure may be referred to as a handover (HO). The serving cell sends a HO command to UE. If the UE fails to obtain the HO command, HO failure (HOF) happens. Therefore, seamless mobility is one of the most important requirements for HetNet.

SUMMARY

According to various embodiments, a radio communication method may be provided. The radio communication method may include: determining in a cell at least one first subframe; determining in the cell at least one second subframe; allocating downlink user traffic in the cell during the first subframe with a low priority; and transmitting a handover command to a user equipment based on the second subframe.

According to various embodiments, a radio communication device may be provided. The radio communication device may include: a determination circuit configured to determine in a cell defined by the radio communication device at least one first subframe and at least one second subframe; an allocation circuit configured to allocate downlink user traffic in the cell during the first subframe with a low priority; and a handover circuit configured to transmit a handover command to a user equipment based on the second subframe.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1A shows a flow diagram illustrating a radio communication method according to various embodiments;

DESCRIPTION

Figure 1B:
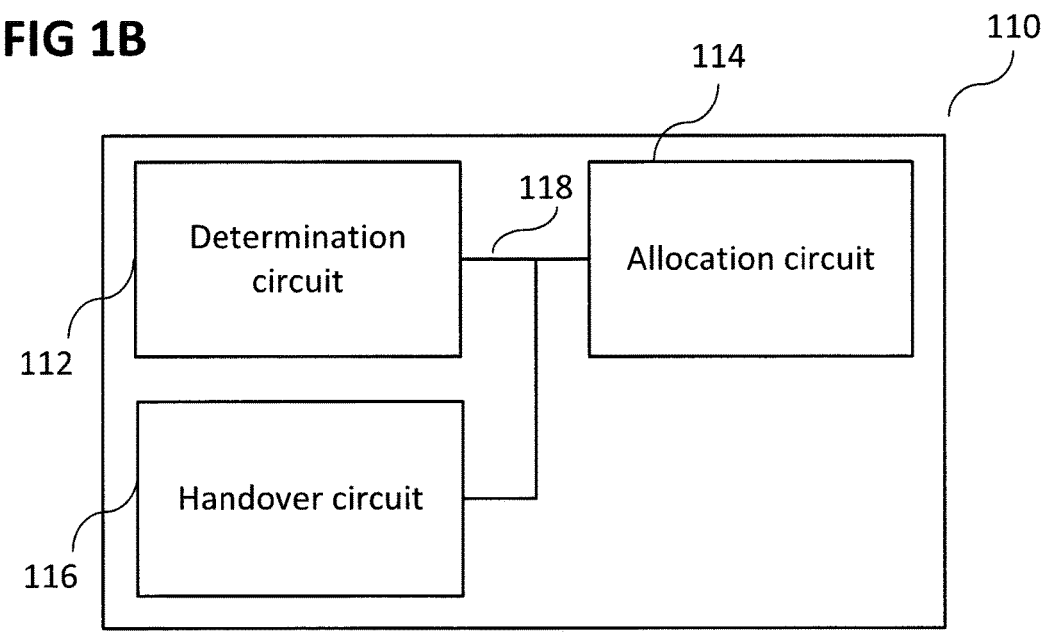
FIG. 1B shows a radio communication device according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

In this context, the radio communication device as described in this description may include a memory which is for example used in the processing carried out in the radio communication device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Heterogeneous networks, which may also be referred to as HetNet, may include various types of service clusters, physically, such as small cells, for example femto-cells, pico-cells, and micro-cells, and macro cells. The HetNet may also include functionally, such as 2G, 3G, 4G, and wireless local area networks (WLAN). The HetNet architecture may significantly improve the system spectrum efficiency. In HetNet, small cells with low transmission power may be overlain over the coverage area of a high-power macro cell. Since the transmission distance between a mobile radio communication device (for example a user equipment (UE)) and a small cell is shorter than that between a UE and a macro cell, significant performance gain may be obtained from the mitigation of path loss. Furthermore, the diversity effect of the various networks in HetNet may enable to support the high demands in communications anytime, anywhere, and to anyone and anything. Thus, the HetNet becomes one of the key and promising technology in future communication systems.

Discontinuity among the different networks arises as a severe issue in HetNet. To support the interoperability among the networks, seamless connectivity may be a key challenge and it is desired to be realized to achieve the full benefit of the HetNet. When a UE is moving out from the coverage area of a currently connecting cell (which may be referred to as serving cell), the UE may need to detach from the serving cell and reattach to another cell (which may be referred to as target cell). This procedure may be referred to as a handover (HO). The serving cell sends a HO command to UE. If the UE fails to obtain the HO command, HO failure (HOF) happens. Therefore, seamless mobility is one of the most important requirements for HetNet. In literature, a number of HO criterions have been proposed to increase the efficiency and reduce the network cost such as bandwidth and network latency to provide the service. However, little work has been done to reduce the HOF.

In most of the advanced wireless communication systems, e.g., 3rd generation partnership project (3GPP) long-term evolution (LTE)/LTE-Advanced (LTE-A) networks, orthogonal resource based transmission is adopted. Each cell allocates orthogonal resources such as time slots or frequency bands to different users so that they do not mutually interfere with each other. However, due to the limited resource, the same resource should be reused at neighboring cells. Since a HO UE (in other words, a UE which is to perform HO) is generally located at the cell edge of the serving cell, the UE is subjected to strong interference from neighboring cells. Therefore, how to reduce such interference during HO procedure has been a challenging issue. This issue becomes even more relevant in HetNet where a macro-cell may overlap with a number of small cells.

According to various embodiments, a context-aware resource reservation strategy for HOF reduction in orthogonal resource-based wireless communication system may be provided. The strategy according to various embodiments may utilize the user/network-context information to preserve a specific resource, e.g., time-slot and frequency band, for HO procedure so that the HO UE can receive HO command from the serving cell with less interference. According to various embodiments, a handover command protection (HOP) subframe may be provided as a specific context-aware preserved resource. The physical HOP subframes may include (or may be) multiple subframes that can be configured as an almost blank subframe (ABS) in each radio frame. Each cell is assigned to multiple logical HOP subframes according to its locally unique physical cell identity (PCI) and network-context information, i.e., traffic load. The assigned physical HOP subframes have the lowest priority for downlink user traffic allocation at each cell. Each cell may try and avoid as much as possible allocating downlink user traffic to the assigned physical HOP subframes. During HO, the serving cell selects one of the physical HOP subframes except its own physical HOP subframe and sends the HO command to the served UE. Thereby, the interferences from other cells including the target cell can be reduced. Since the HOP subframe reservation is highly possible when the traffic load is low, the HOF rate reduces as the traffic load decreases in the networks. Hence, when the traffic load in a target cell reduces, the higher interference mitigation effect becomes more effective, resulting in lower HOF rate.

In LTE/LTE-A networks, the HO procedure may start with the UE sending a measurement report to the serving cell. The measurement report contains the PCI of the neighboring cells and their reference signal received power (RSRP) values. This enables the serving cell to calculate the location of the HOP subframe of the neighboring cells from the PCI list. Thus, the serving cell utilizes that information to recognize the HOP subframes of the neighboring cells and use one of them to send HO command to the HO UE. Methods and devices according to various embodiments may be backward compatible and may require neither additional signaling/overhead nor protocol modification of the current 3GPP standard. The methods and devices according to various embodiments can be generally employed to homogeneous networks as well.

To further improve the effectiveness of the strategy according to various embodiments, the user-context information can be utilized. The neighboring cells the UE needs to monitor may be instructed by the serving cells. To select the neighboring cells for monitoring, the serving cell may utilize the UE-context information, e.g., travelling speed and travelling direction. By this, the serving cell selects the HOP subframe with more efficient way.

According to various embodiments, context-aware handover methods and devices may be provided.

FIG. 1A shows a flow diagram 100 illustrating a radio communication method according to various embodiments. In 102, at least one first subframe (in other words: portion of a frame) may be determined in a cell. In 104, at least one second subframe may be determined in the cell. In 106, downlink user traffic in the cell during the first subframe may be allocated with a low priority. In 108, a handover command may be transmitted to a user equipment based on the second subframe.

In other words, at least one first portion and at least one second portion of a frame structure may be determined, and downlink user traffic may be avoided whenever possible during the first portion and in case of a desired handover, a user equipment may be instructed to make use of the second portion for the handover.

According to various embodiments, the at least one first subframe may be at least one handover command protection subframe of the cell.

According to various embodiments, the at least one second subframe may be at least one handover command protection subframe of a neighboring cell of the cell.

According to various embodiments, determining the at least one first subframe may include or may be determining at least one first logical subframe.

According to various embodiments, the radio communication method may further include mapping the at least one first logical subframe to at least one physical subframes to determine the at least one first subframe.

According to various embodiments, the at least one second subframe may be determined based on at least one of a measurement report, measured traffic load information, or traffic load information exchanged over an X2 link.

According to various embodiments, the at least one first subframe may be determined based on traffic load information of the cell and its physical cell identity.

According to various embodiments, the radio communication method may further include grouping a plurality of user equipments based on user equipment context information.

According to various embodiments, the radio communication method may further include determining user profiling information. According to various embodiments, the handover command may be transmitted to the user equipment based on the user profiling information.

According to various embodiments, the user profiling information may include at least one of a traveling pattern of the user or routing information of the user.

FIG. 1B shows a radio communication device 110 (for example a base station, for example a Node B) according to various embodiments. The radio communication device 110 may include a determination circuit 112 configured to determine in a cell defined by the radio communication device 110 at least one first subframe and at least one second subframe. The radio communication device 110 may further include an allocation circuit 114 configured to allocate downlink user traffic in the cell during the first subframe with a low priority. The radio communication device 110 may further include a handover circuit 116 configured to transmit a handover command to a user equipment based on the second subframe. The determination circuit 112, the allocation circuit 114, and the handover circuit 116 may be coupled with each other, like indicated by lines 118, for example electrically coupled, for example using a line or a cable, and/or mechanically coupled.

According to various embodiments, the at least one first subframe may be at least one handover command protection subframe of the cell.

According to various embodiments, the at least one second subframe may be at least one handover command protection subframe of a neighboring cell of the cell.

According to various embodiments, the determination circuit 112 may be configured to determine at least one first logical subframe.

According to various embodiments, the determination circuit 112 may be configured to map the at least one first logical subframe to at least one physical subframes to determine the at least one first subframe.

According to various embodiments, the determination circuit 112 may be configured to determine the at least one second subframe based on at least one of a measurement report, measured traffic load information, or traffic load information exchanged over an X2 link.

According to various embodiments, the determination circuit 112 may be configured to determine the at least one first subframe based on traffic load information of the cell and its physical cell identity.

Figure 1C:
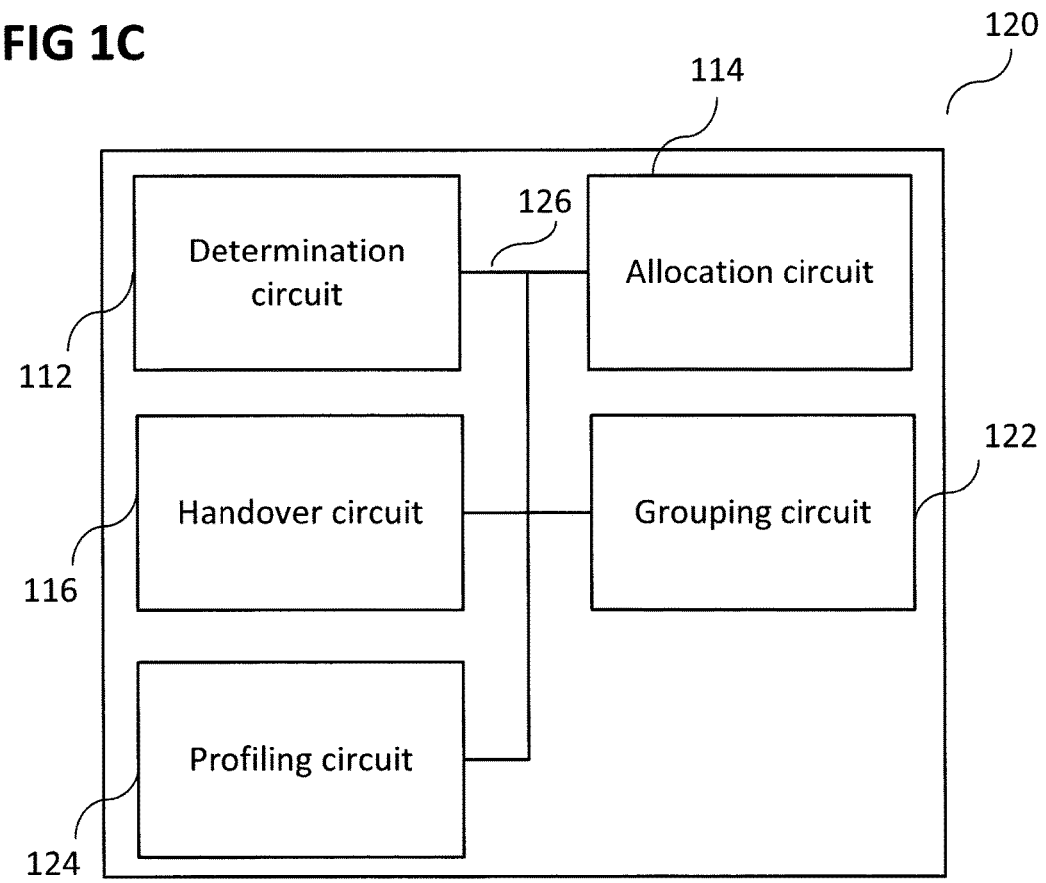
FIG. 1C shows a radio communication device according to various embodiments.

FIG. 1C shows a radio communication device 120 (for example a base station, for example a Node B) according to various embodiments. The radio communication device 120 may, similar to the radio communication device 110 shown in FIG. 1B, include a determination circuit 112 configured to determine in a cell defined by the radio communication device 120 at least one first subframe and at least one second subframe. The radio communication device 120 may, similar to the radio communication device 110 shown in FIG. 1B, further include an allocation circuit 114 configured to allocate downlink user traffic in the cell during the first subframe with a low priority. The radio communication device 120 may, similar to the radio communication device 110 shown in FIG. 1B, further include a handover circuit 116 configured to transmit a handover command to a user equipment based on the second subframe. The radio communication device 120 may further include a grouping circuit 122, like will be described in more detail below. The radio communication device 120 may further include a profiling circuit 124, like will be described in more detail below. The determination circuit 112, the allocation circuit 114, the handover circuit 116, the grouping circuit 122, and the profiling circuit 124 may be coupled with each other, like indicated by lines 126, for example electrically coupled, for example using a line or a cable, and/or mechanically coupled.

According to various embodiments, the grouping circuit 122 may be configured to group a plurality of user equipments based on user equipment context information.

According to various embodiments, the profiling circuit 124 may be configured to determine user profiling information. According to various embodiments, the handover circuit 116 may be is configured to transmit the handover command to the user equipment based on the user profiling information.

According to various embodiments, the user profiling information may include or may be at least one of a traveling pattern of the user or routing information of the user.

In the following, a summary of handover procedure in 3GPP LTE/LTE-A networks will be given.

The serving cell may send a radio resource control (RRC) message (RRCConnectionReconfiguration message) to a UE. This RRC message may include the neighboring cell list the UE needs to monitor and the specific event on which the UE should send a measurement report [A-1].

Figure 2:
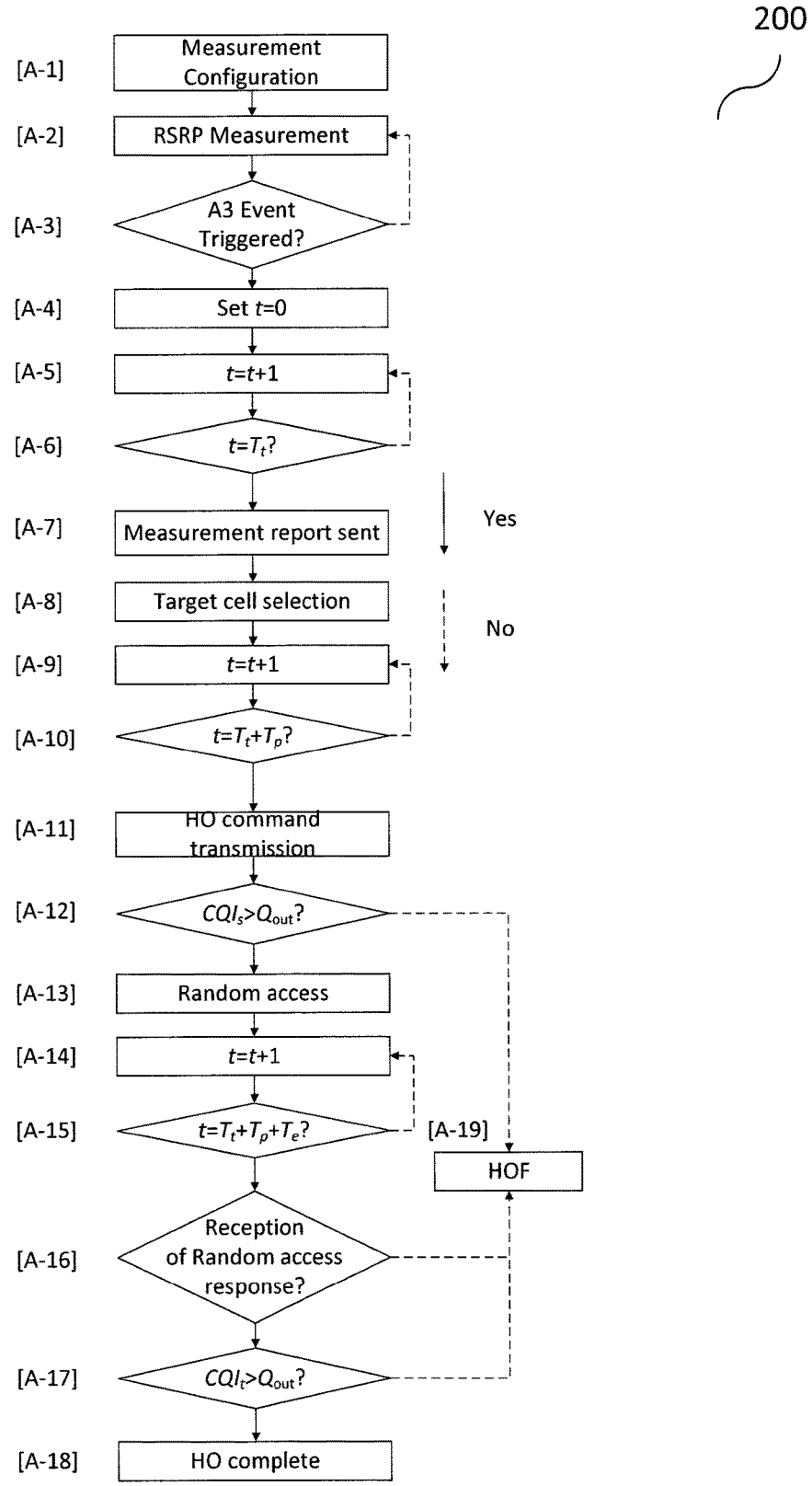
FIG. 2 shows a schematic flowchart of a handover (HO) procedure according to various embodiments.

FIG. 2 shows an diagram 200 illustrating a HO procedure.

In the following, event trigger will be described.

The UE measures the RSRP values of neighboring cells as instructed by the serving cell [A-2]. One of the specific events is Event A3 [A-3]. Event A3 is defined as the condition when the signal strength of a neighboring cell becomes larger than that of the serving cell with an A3 offset:

$$P_s + \Delta_{A3} < P_t \qquad (1)$$

where $P_s$ and $P_t$ are the RSRP values of the serving cell and the target cell, and $\Delta_{A3}$ is the A3 offset (dB).

Figure 3:
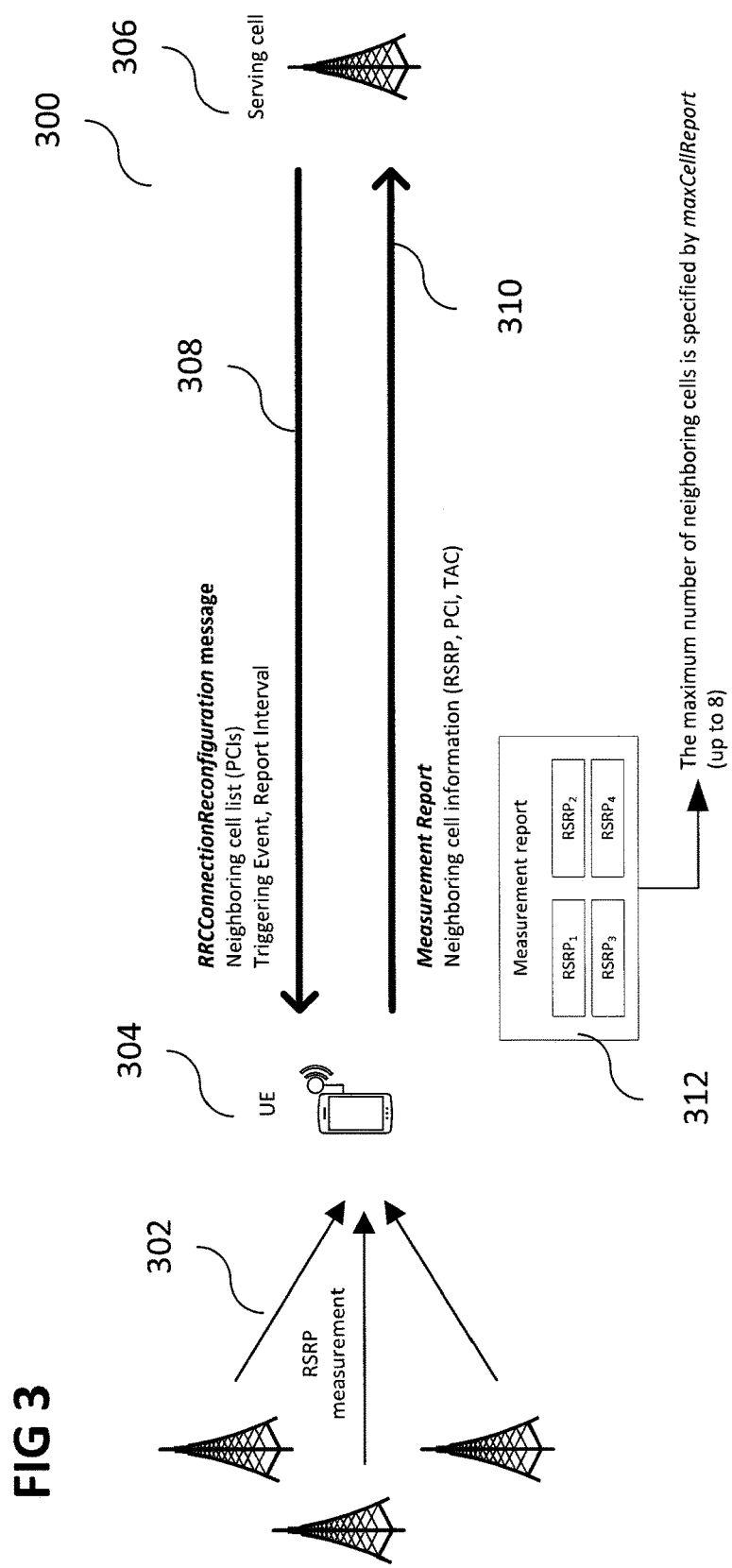
FIG. 3 shows an illustration of a measurement report according to various embodiments.

FIG. 3 shows an illustration 300 of a measurement report according to various embodiments.

Once Event A3 is triggered and the condition holds longer than a predetermined time-to-trigger (TTT) period, $T_t$ (sec) ([A-4, A-5, A-6]), UE 304 sends measurement report 310 to its serving cell 306 ([A-7]). This may for example be triggered by the RRCConnectionReconfiguration message 308. The measurement report 310 includes the received signal strength, i.e., RSRP, and PCI of the neighboring cells 302 (like illustrated by 312 in FIG. 3). Once the specific event happens, the UE sends MeasurementReport message, which includes MeasResults information element (IE), to the serving cell. The report includes the specific information such as RSRP values of its serving cell and neighboring cells.

In the following, HO preparation will be described.

Upon the successful receipt of the measurement report from the UE, the serving cell decides whether the HO should be triggered and to which cell the UE should be handed over, i.e., a target cell decision [A-8]. Once the decisions are made, the serving cell exchanges the required information with the target cell. This process takes $T_p$ (sec) [A-9, A-10]. Then, the decision and information required for HO are stored in MobilityControlInfo container and informed to UE by an RRCConnectionReconfiguration message, which is sent via physical downlink shared channel (PDSCH) [A-11]. The resource allocation information of the PDSCH containing an RRCConnectionReconfiguration message is notified to UE by control information in physical downlink control channel (PDCCH). If the channel quality indicator (CQI) is below the threshold, i.e., $CQI_s < Q_{out}$ [A-12], the UE fails to decode the control information in PDCCH and therefore HOF is declared [A-19].

In the following, HO execution will be described.

If UE successfully receives HO command, the UE detaches from the serving cell and tries to synchronize to the target cell via random access (RA) procedure [A-13]. After RA to the target cell, the UE monitors the random access response (RAR) from the target cell. The window size for this monitoring is $T_e$ (sec) [A-14, A-15]. If RAR is successfully received within $T_e$ (sec) [A-16, A-17], HO procedure is complete [A-18]. If UE fails to decode the RAR, i.e., $CQI_t < Q_{out}$ [A-17], HOF is declared [A-19].

In the following, a problem of handover procedure will be described.

If $CQI_s$ is below $Q_{out}$ when the HO command is transmitted, the UE cannot correctly receive the command from the serving cell [A-12]. This is mainly due to the fact that the HO UE is moving away from the serving cell. Therefore, the signal power from the serving cell is decreasing (like illustrated by 402 in FIG. 4, which shows an illustration 400 of a measurement event A3 triggering and PDCCH decoding failure according to various embodiments) while the interference from neighboring cells increases (like illustrated by 404). To avoid such a situation, a kind of coordination is necessary for the HO command transmission. On the other hand, if $CQI_t$ is below $Q_{out}$ when the RAR is transmitted, the UE cannot correctly receive the RAR from the target cell [A-17]. This is because sometimes the HO UE still receives the signal from the serving cell with sufficiently high power.

In LTE/LTE-A networks, the control information is conveyed in the unit of logical control channel element (CCE). The logical CCE is mapped onto physical resource element groups (REGs), which are distributed over whole system frequency band, via a static pseudo-random interleaving and cyclic shift and UE-specific mapping offset. The static pseudo-random interleaving and cyclic shift are applied at each cell based on the PCI. The UE-specific mapping offset is determined by UE's cell-radio network temporary identity (C-RNTI) and subframe index. Different from user data scheduling in PDSCH, the scheduling of control information signaling in PDCCH is inflexible. This inflexibility of resource allocation makes control information vulnerable to the interference. To overcome this inflexibility, in LTE Rel.11, enhanced PDCCH (ePDCCH) has been introduced. Different from legacy PDCCH, ePDCCH is frequency-multiplexed within PDSCH region and can be scheduled to UEs in an interference-aware manner. However, ePDCCH is not available to legacy handsets.

In the following, parameter optimization will be described.

Figure 4:
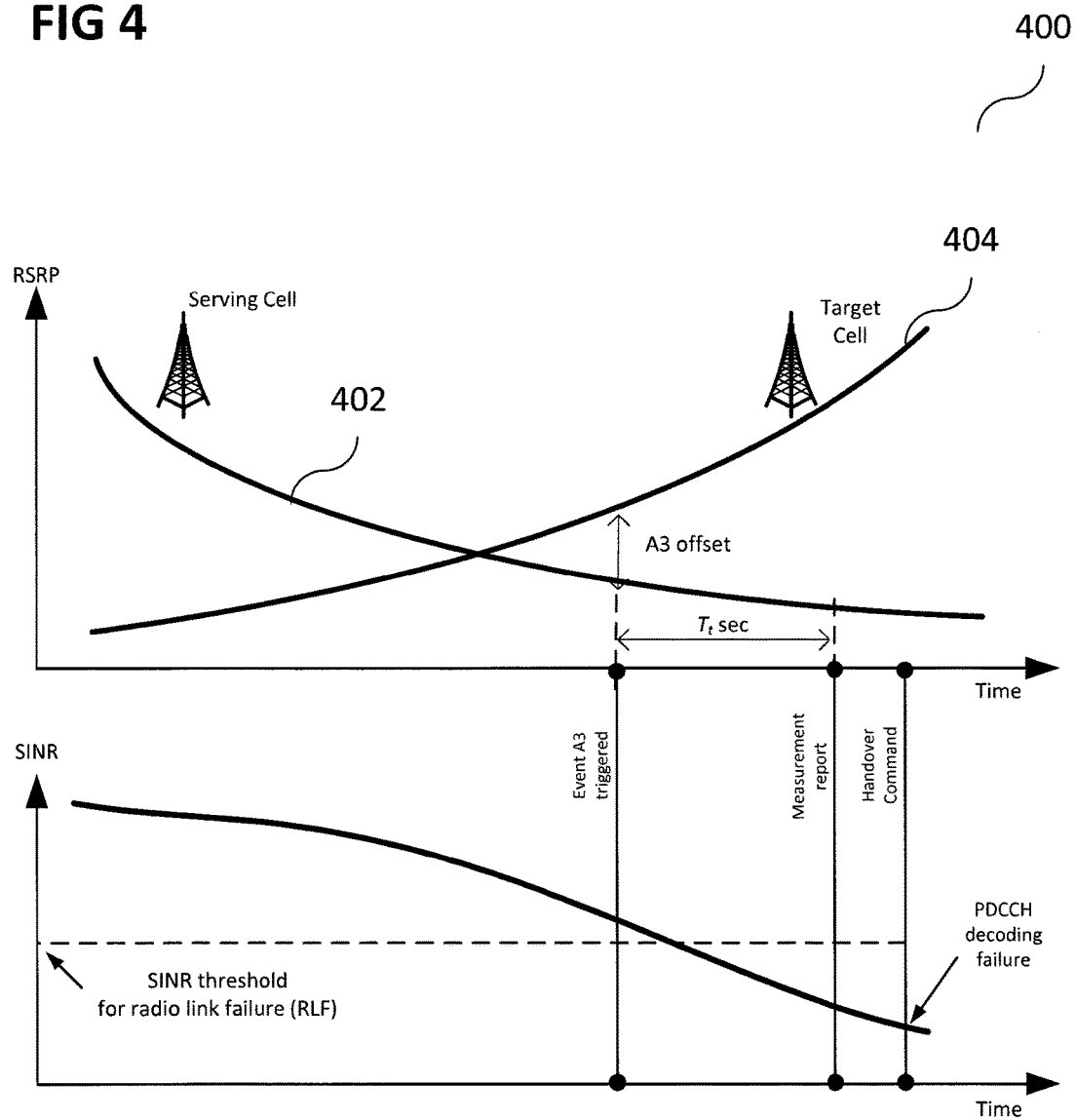
FIG. 4 shows an illustration of a measurement event A3 triggering and PDCCH decoding failure according to various embodiments.

One of the main causes of PDCCH decoding failure may be delay of the measurement report due to TTT. As shown in FIG. 4, a UE may wait $T_t$ sec before sending measurement report to its serving cell. If the UE is moving fast, the RSRP value of the serving cell rapidly decreases and results in low signal-to-interference plus noise ratio (SINR). To avoid such situations, TTT value may be scaled based on the knowledge of UE's mobility state (low, medium, and high). UE's mobility state may be obtained by counting the number of HO's or cell selections during observation time window duration ($T_{CRmax}$), which is broadcasted by the network through system information block 3 (SIB3). If UE's mobility state is considered as either medium or high, the TTT value is scaled down, so that the impact of the delay due to TTT can be reduced.

In the following, RRC diversity will be described.

An RRC diversity may be a potential solution for improving mobility robustness, especially in HetNet. With the RRC diversity, the HO related RRC signaling could additionally be transmitted from or to a potential target cell. Radio link failure (RLF) may be prevented as long as a UE is able to maintain a connection to at least one of the cells. This may eventually lead to a more successful HO performance (i.e. avoiding UE RRC re-establishment procedure). The RRC diversity scheme may be also applied to HO from a macro cell to a small cell, HO between macro cells, and HO between small cells.

In the following, PCI optimization and adaptive C-RNTI will be described.

In HetNet, where high-power macro cells and low-power small cells coexist, the interference issue in PDCCH region may also be a critical problem. A concept of orthogonally-filled subframe (OFS) may be provided, wherein PCI optimization and adaptive C-RNTI management may be provided in order to orthogonalize the occupied PDCCH regions of a macro cell and a small cell.

In the following, physical cell Identity (PCI) and control signals will be described.

Figure 5:
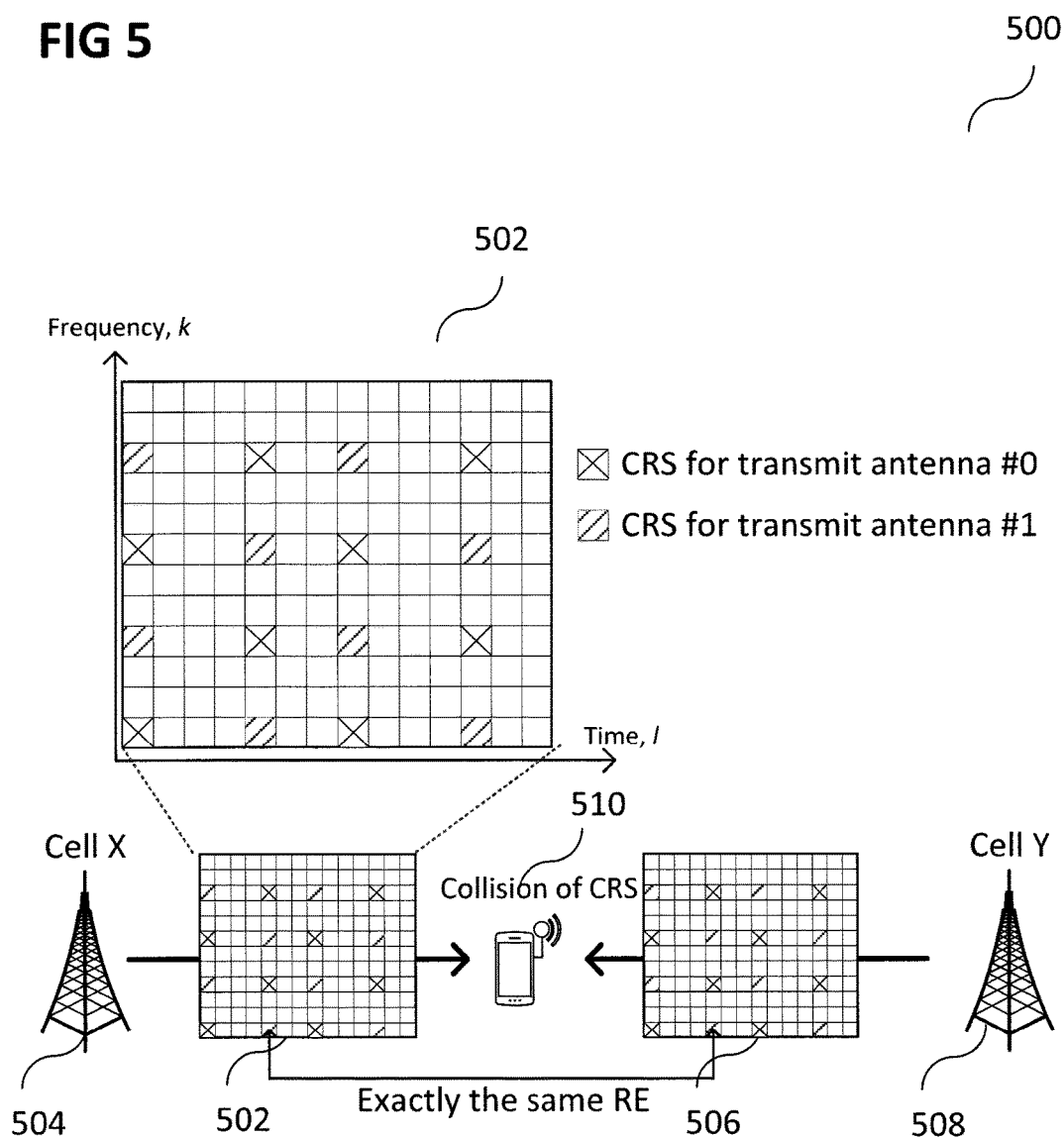
FIG. 5 shows an illustration of a CRS collision according to various embodiments.

In LTE/LTE-A networks, each cell has a unique PCI, which is a locally assigned index between 0 and 503. The number of PDCCH orthogonal frequency division multiplexing (OFDM) symbols varies from 1 to 3, which depends on traffic load and is broadcasted to each network through a physical control format indicator channel (PCFICH). If a UE fails to decode PCFICH, it also cannot decode the PDCCH. For RSRP measurement and PDCCH demodulation, cell-specific reference signal (CRS) is multiplexed across time-and-frequency resource elements (RE) in each physical resource block (PRB). If the neighboring cells are transmitting the CRS on the same RE, collision happens like illustrated for a UE 510 shown in the illustration 500 of FIG. 5. This collision incurs the inaccurate RSRP measurement and PDCCH demodulation error, resulting in significantly degradation of system performance. FIG. 5 shows a time-and-frequency resource elements scheme 502 of a first cell 504, and a time-and-frequency resource elements scheme 506 of a second cell 508.

To avoid the frequent collisions among CRSs and among PCFICHs, in LTE/LTE-A networks, a frequency domain offset may be introduced to the RE locations of PCFICH and CRS according to the PCI. Let us denote the PCI of cell i by $Q_i \in [0, \ldots 503]$. The CRS of the antenna port $p \in [0,1]$ may be mapped onto REs with a time-domain symbol index $n_{i,p}$ and a frequency-domain subcarrier index $k_{i,p}$ as follows:

$$\begin{cases} n_{i,p} = 0 \\ k_{i,p} = 6m + (v_p + \mathrm{mod}(v_{shift}, 6)) \end{cases} \quad (2)$$

where $m \in [0, \ldots, 2N_{DL}^{RB}-1]$ ($N_{DL}^{RB}$ is the number of RBs), $v_{shift} = \mathrm{mod}(Q_i, 6)$, and $$v_p = \begin{cases} 0, & p = 0 \\ 3, & p = 1 \end{cases} \quad (3)$$

By defining a resource element group (REG), which consists of four consecutive non-CRS REs, the four quadruplets q of PCFICH REs are mapped onto four REGs. The lowest-index RE has the following indices:

$$\begin{cases} n_{i,q} = 0 \\ k_{i,p} = \mathrm{mod}\left(\bar{k} + 6\left\lfloor \frac{qN_{RB}^{DL}}{2} \right\rfloor, 12N_{RB}^{DL}\right) \\ \bar{k} = 6\mathrm{mod}(Q_i, 2N_{RB}^{DL}) \\ q \in [0, 3] \end{cases} \quad (4)$$

Eqs. (2) and (4) show that the frequency domain offset is applied to the locations of CRS and PCFICH according to the PCI value of the cell. When the cell is deployed by the operator, the PCI assignment to each cell is carried out so that the collision of REs of PCFICH and CRS can be reduced. This is the key observation for the proposed strategy.

In the following, almost blank subframe (ABS) will be described.

Figure 6:
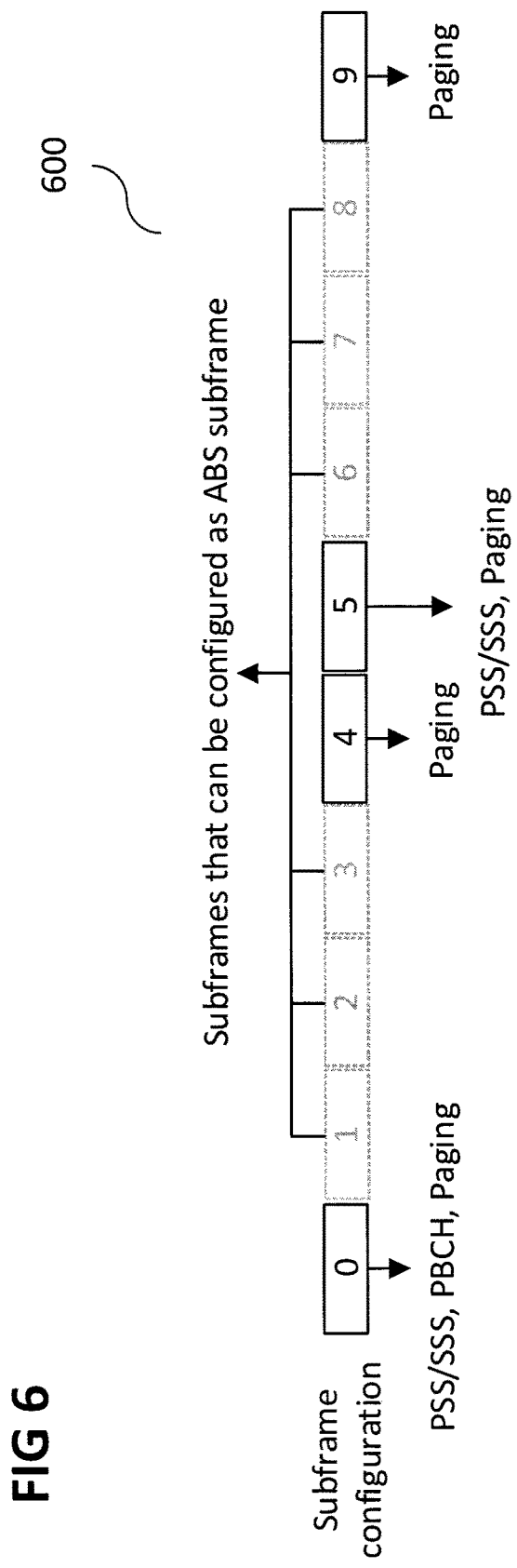
FIG. 6 shows an illustration of an Almost blank subframe (ABS) in one radio frame according to various embodiments.

In HetNet, the cell-edge UE in a small cell is subjected to huge interference from a high-power macro cell. This interference negatively offset the performance gain obtained by HetNet over the conventional homogeneous networks, where only high-power macro cells operate. To overcome this interference issue, an enhanced inter-cell interference coordination (eICIC) may be provided in 3GPP LTE Rel.10. In the eICIC, a high-power macro cell transmits no control and user data signals during predetermined subframes, which are called almost blank subframes (ABSs). During ABS, the low-power small cell allocates control and user data signals to its serving the small cell boundary UEs without the devastating interference from the macro cell. 3GPP LTE/LTE-A adopts subframe based transmission structure 600 as shown in FIG. 6. In 3GPP LTE/LTE-A, almost blank subframe (ABS) may be provided for enhanced inter-cell interference coordination (eICIC) in order to improve the performance of UE in small cell boundary. The available ABSs are 1st, 2nd, 3rd, 6th, 7th, 8th subframes with the subframe indices 1, 2, 3, 6, 7, and 8 as shown in FIG. 6. Therefore, the number of available ABSs is 6. The other remaining 4 subframes contain essential control/reference signals such as primary synchronization signal (PSS), secondary synchronization signal (SSS), physical broadcast channel (PBCH), and paging. Therefore, those 4 subframes cannot be set to be an ABS.

Figure 7:
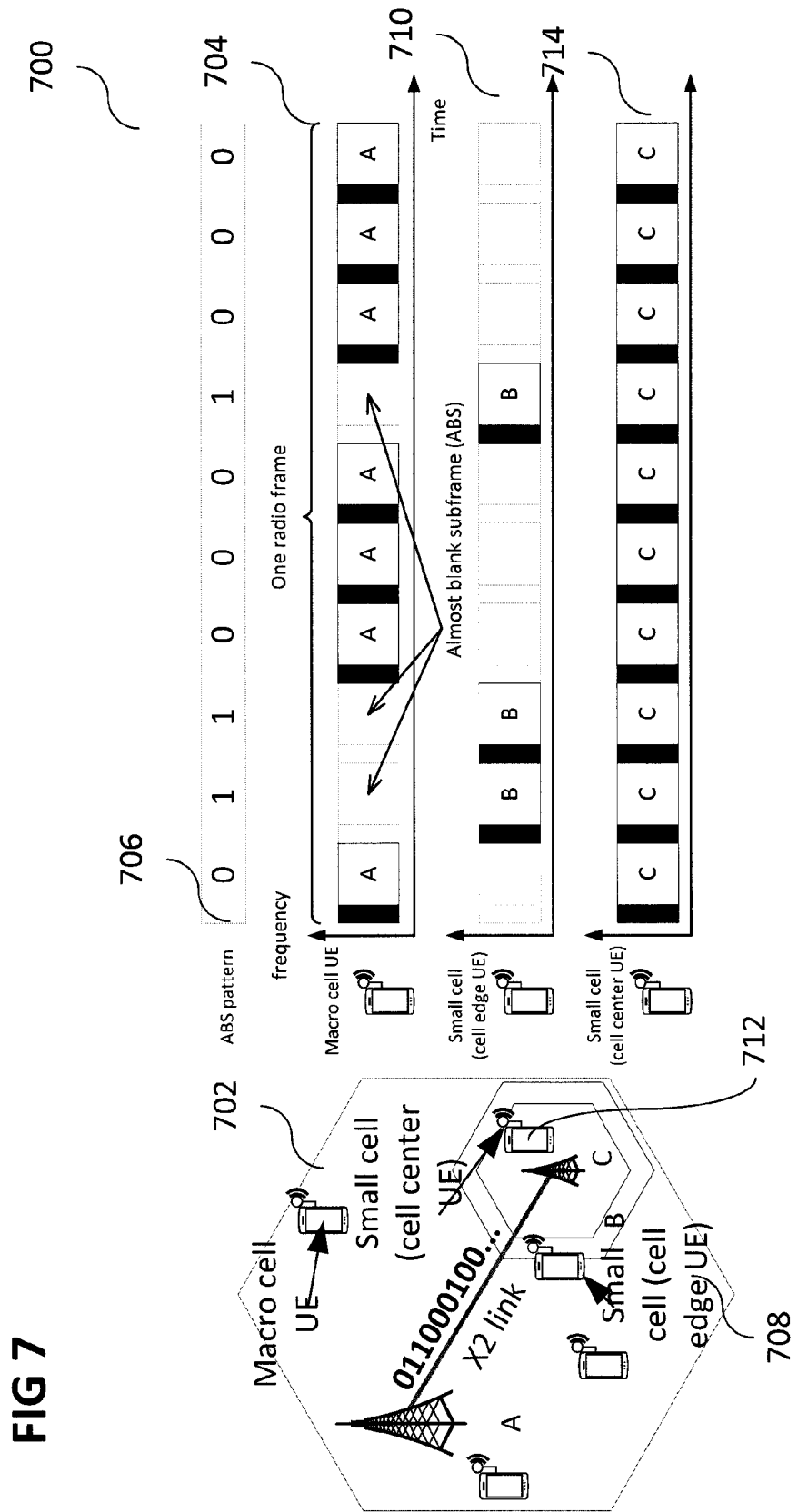
FIG. 7 shows an illustration of an enhanced inter-cell interference coordination (eICIC) in HetNet according to various embodiments.

During ABS transmission, the high-power macro cell 702 does not transmit any signal except for CRS as shown in illustration 704 of a frame in the illustration 700 of FIG. 7. The ABS pattern information 706 is transferred to neighboring small cells via an X2 logical link in 40 bits bitmap (for duration of 40 msec). During ABSs, a small cell 708 may transmit cell-boundary UE's data 710 to avoid huge interference from high-power macro cell. On the other hand, the UEs who are closed to the center of small cell coverage, i.e., the UEs (like UE 712) who are not suffering huge interferences from the macro cell, can be allocated to any of all subframes 714.

In the following, a handover command protection (HOP) subframe according to various embodiments will be described.

According to various embodiments, a handover command protection (HOP) subframe, may be provided as a specific realization of the context aware resource reservation strategy. The physical HOP subframes may include or may be multiple subframes with reduced transmission power such as an almost blank subframe (ABS) in each radio frame. Signaling of HOP subframes may be implicit or explicit. In the case of implicit signaling, the assignment of physical HOP subframes to each cell may be performed in two steps. Firstly, one of logical HOP subframes is assigned to each cell according to its locally unique physical cell identity (PCI). Then, a mapping function may assign one or multiple physical HOP subframes to each logical HOP subframe based on the traffic load of each cell. In the case of explicit signaling, the physical HOP subframe assignment information may be exchanged based on explicit signaling over inter-cell communications (e.g. via X2 or mobility management entity (MME) interfaces).

The assigned physical HOP subframes may have the lowest priority for downlink user traffic allocation at each cell. Each cell may try and avoid as much as possible allocating downlink user traffic to the assigned physical HOP subframes. During HO, the serving cell selects one of the physical HOP subframes except its own physical HOP subframe and sends the HO command to the served UE. Thereby, the interferences from other cells including the target cell can be reduced. Since the HOP subframe reservation is highly possible if the traffic load is low, a HOF ratio reduces as a traffic load decreases in the networks.

Figure 8:
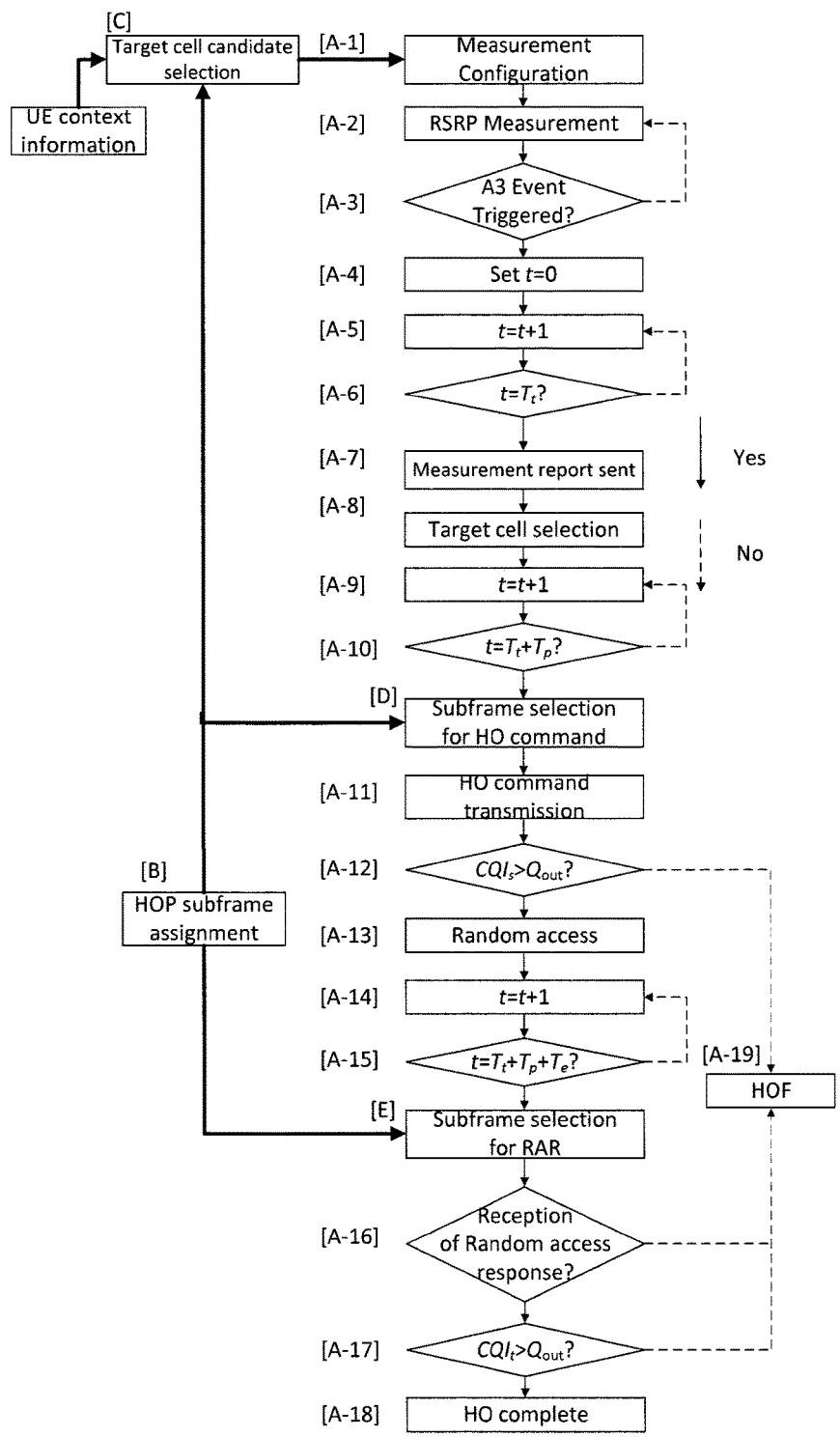
FIG. 8 shows an illustration of a schematic flowchart of HO procedure with HOP subframe according to various embodiments.

FIG. 8 shows a schematic flowchart 800 of HO procedure that takes into account the HOP subframe and context-aware target cell selection.

In the following, a handover command Protection (HOP) subframe assignment module (which may be referred to as "[B]", and which may be configured to carry out the processing indicated by [B] in FIG. 8, will be described.

When the HO UE receives HO command, PDCCH is subjected to interference from neighboring cells. To reduce the interference of HO UEs' PDCCH, the ABSs are used.

Each cell is assigned to multiple physical HOP subframes. The assignment is done in two steps. Each cell is first assigned to one logical HOP subframe according to its PCI. Then, each logical HOP subframe is mapped onto multiple physical HOP subframes based on its traffic load. We introduce two index sets L={0,1,2,3,4,5} and T={1,2,3,6,7,8}. In the following, we will describe the assignment of HOP subframes to cell i whose PCI is $Q_i \in [0, \ldots, 503]$.

The HOP subframe assignment module [B] may include the following four modules:

[B-1]: Logical HOP subframe assignment module,
[B-2]: Traffic load monitoring module,
[B-3]: Physical HOP subframes determination module, and
[B-4]: Physical HOP subframe mapping module.

In the following, a first step (for example a step of logical HOP subframe assignment module [B-1], like shown in the illustration 900 of FIG. 9) will be described.

In this module, a logical HOP subframe is assigned to each cell according to their PCI. The input to this module is PCI $Q_i$ and the output of this module is logical HOP subframe index $l_i$. The logical HOP subframe index $l_i \in L$ is obtained as $$l_i = \mathrm{mod}(Q_i, 6) \tag{5}$$

As it is described herein, when the cell is deployed by the operator, the PCI assignment is carried out so that the collision of REs of CRS and PCFICH with the neighboring cells can be avoided as much as possible. This implies that logical HOP subframe of the neighboring cell is different from that of the cell of interest with high probability.

In the following, a second step (for example a step of traffic load monitoring module [B-2] and physical HOP subframes determination module [B-3] like illustrated in FIG. 9) will be described.

In the physical HOP subframes determination module [B-3], the number of physical HOP subframes is determined based on the traffic load $\rho_i$, which is provided by the traffic load monitoring module [B-2]. This traffic load monitoring module [B-2] also provides the traffic load information to neighboring cells via X2 logical link. The output of the physical HOP subframes determination module [B-3] is the number of physical HOP subframes $M(\rho_i)$. If the traffic load $\rho_i$ is high, we set $M(\rho_i)=1$. On the other hand, we set up to $M(\rho_i)=5$ if traffic load is low. An example of mapping from traffic load $\rho_i$ to the number of physical HOP subframes $M(\rho_i)$ is given in Table 1, where $\bar{\rho}_0 \sim \bar{\rho}_5$ are arbitrarily designed.

TABLE 1

Number of physical HOP subframes and traffic load.

| Traffic load $\rho_i$ | Number of physical HOP subframes $M(\rho_i)$ |
|---|---|
| $\bar{\rho}_1 \leq \rho_i < \bar{\rho}_0$ | 1 |
| $\bar{\rho}_2 \leq \rho_i < \bar{\rho}_1$ | 2 |
| $\bar{\rho}_3 \leq \rho_i < \bar{\rho}_2$ | 3 |
| $\bar{\rho}_4 \leq \rho_i < \bar{\rho}_3$ | 4 |
| $\bar{\rho}_5 \leq \rho_i < \bar{\rho}_4$ | 5 |

In the following, a third step (for example a step of physical HOP subframe mapping module [B-4] like shown in FIG. 9) will be described.

In this module, logical HOP subframe $l_i \in L$ may be mapped onto physical HOP subframes. The inputs to the physical HOP subframe mapping module [B-4] are logical HOP subframe $l_i$ from logical HOP subframe assignment module [B-1] and the number of physical HOP subframes $M(\rho_i)$ from number of physical HOP subframes determination module [B-3]. The output of the physical HOP subframe mapping module [B-4] is a physical HOP subframe vector $t_i(\rho_i, l_i)$.

The physical HOP subframe vector may be given as:

$$t_i(\rho_i, l_i) = F_{M(\rho_i)} e_{l_i} \tag{6}$$

where $e_l$ is a 6-by-1 column vector with a 1 at the lth element and 0's elsewhere and $F_{M(\rho_i)}$ is a 10-by-6 mapping matrix. The number of 1's in each column of $F_{M(\rho_i)}$ is $M(\rho_i)$. According to Table 1, we set $M(\rho_i)=1$ for $\bar{\rho}_1 \leq \rho_i < \bar{\rho}_0$.

An example of the mapping matrix $F_1$ is given as $$F_1 = \begin{pmatrix} 0 & 0 & 0 & 0 & 0 & 0 \\ 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 0 & 0 \\ 0 & 0 & 0 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \end{pmatrix} \tag{7}$$

On the other hand, it is possible to assign up to five physical HOP subframes to each cell, i.e., $M(\rho_i)=5$, and an example of the corresponding matrix $F_5$ is given as $$F_5 = \begin{pmatrix} 0 & 0 & 0 & 0 & 0 & 0 \\ 1 & 0 & 1 & 1 & 1 & 1 \\ 1 & 1 & 0 & 1 & 1 & 1 \\ 1 & 1 & 1 & 0 & 1 & 1 \\ 0 & 0 & 0 & 0 & 0 & 0 \\ 0 & 0 & 0 & 0 & 0 & 0 \\ 1 & 1 & 1 & 1 & 0 & 1 \\ 1 & 1 & 1 & 1 & 1 & 0 \\ 0 & 1 & 1 & 1 & 1 & 1 \\ 0 & 0 & 0 & 0 & 0 & 0 \end{pmatrix} \tag{8}$$

Figure 10:
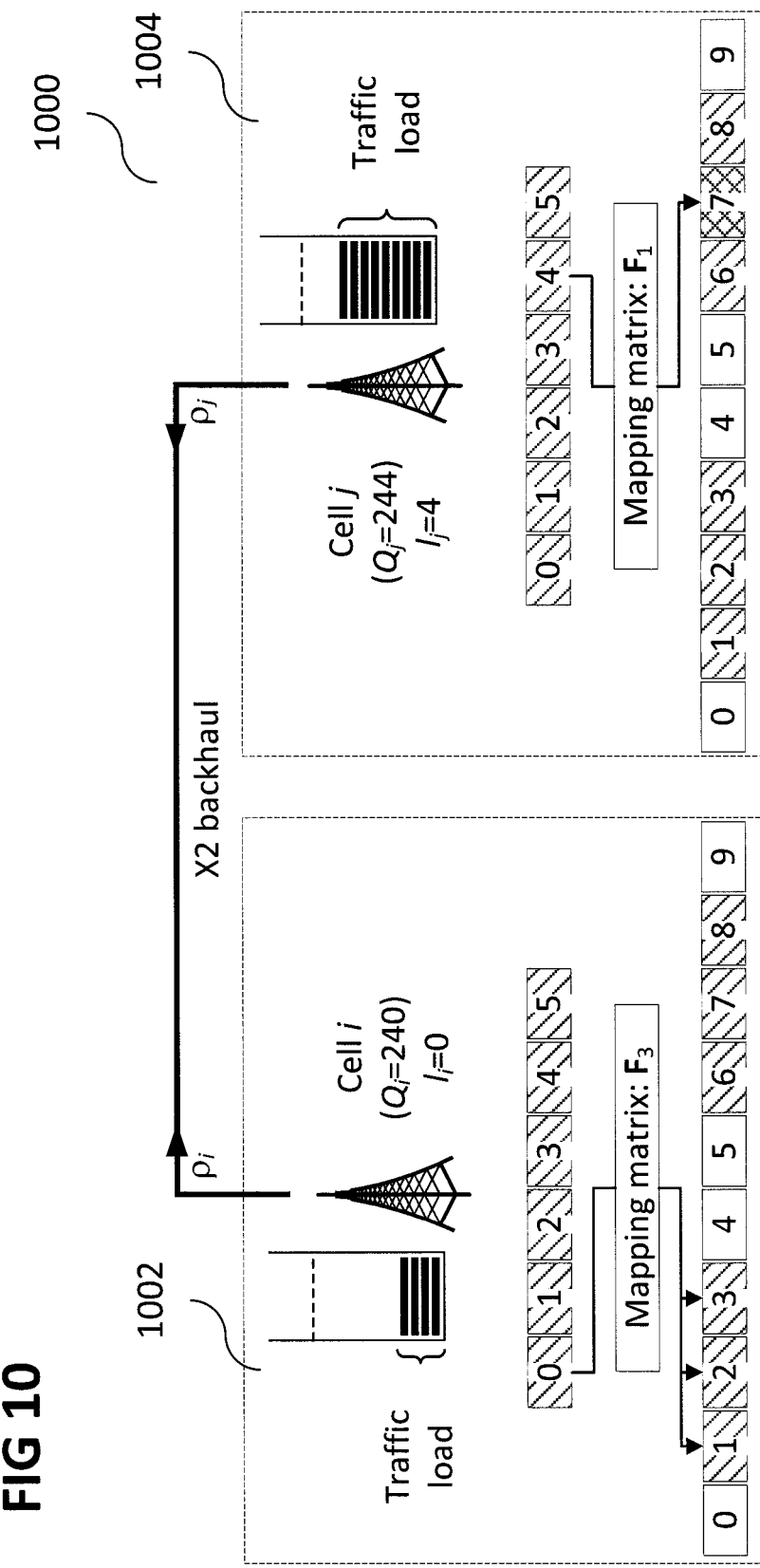
FIG. 10 shows an illustration of a mapping from logical HOP subframe to physical HOP subframes according to various embodiments.

Suppose PCIs of cell i and j is $Q_i=240$ and $Q_j=244$, respectively. The logical HOP subframe indices become $l_i=\mathrm{mod}(240,6)=0$ and $l_j=\mathrm{mod}(244,6)=4$. With the use of $F_3$, the physical subframes 1, 2, 3 are assigned as physical HOP subframes to cell i (1002) as shown in Table 2 and illustration 1000 of FIG. 10. Accordingly, the physical subframe 7 is assigned to cell j (1004). Therefore, the scheduler at cell i tries not to allocate downlink traffic in subframe 1, 2, 3 as they are declared to be its physical HOP subframe, which is reserved for HO UEs in neighboring cells to send their HO commands.

TABLE 2

An example of input & output of HOP subframe assignment module.

| Cell index | Input | Intermediate output | Output |
|---|---|---|---|
| Cell i | PCI, $Q_i = 240$<br>Traffic load, $\rho_i = 0.5$ | $l_i = 0$<br>$M(\rho_i) = 3$ | $t_i(\rho_i, l_i) =$<br>(0111000000) |
| Cell j | PCI, $Q_j = 244$<br>Traffic load, $\rho_j = 0.8$ | $l_j = 4$<br>$M(\rho_j) = 1$ | $t_j(\rho_j, l_j) =$<br>(0000000100) |

Figure 11:
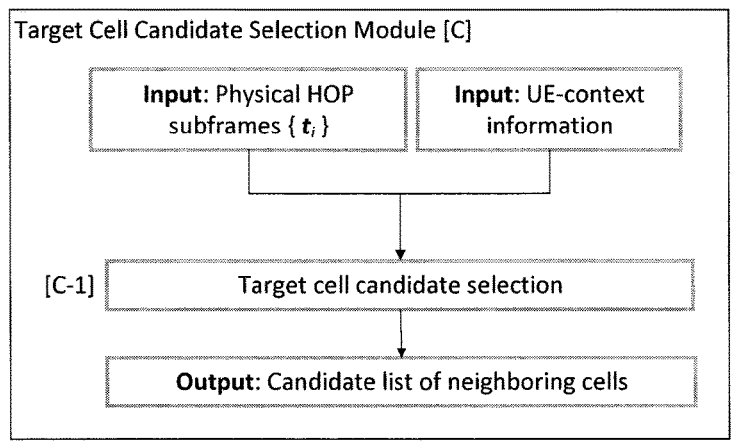
FIG. 11 shows an illustration of a target cell candidate selection module according to various embodiments.

In the following, a target cell candidate selection module (like indicated by [C] in illustration 1100 of FIG. 11) will be described.

Context-aware strategies may provide a mobile assisted handover using user direction and location information. When the distance between a serving cell and mobile is greater than a predefined threshold, a target cell list, which is called base site frequency list, is updated to include non-adjacent cells. To recognize and include the non-adjacent cells into the list, direction information of mobile is used. In another preliminary example, a location determination system, with the aid of stored information on signal characteristics and the estimated distance, was proposed to determine the location of a mobile unit within a microcell. Also, handover determination system using the location information of mobile unit may be provided. Signal characteristics may be used to differentiate micro and macro cells' signals.

Each cell stores the PCI list of the neighboring cells. The serving cell instructs the UE to monitor the RSRP values of the neighboring cells that are assigned to different logical HOP subframe. Furthermore, if the serving cell has the access to the UE-context information such as travelling speed and directions (some examples are provided in Table 3), the serving cell may be able to create more appropriate target cell list, which can be input to measurement report configuration [A-1]. In target cell candidate selection module [C], the candidate list of neighboring cells, the UE needs to monitor, is generated based on the physical HOP subframes from module [B] and UE-context information. The selected neighboring cells is informed to UE via RRCconnectionreconfiguration message.

TABLE 3

Context and location information.

| Information | | Information origin |
| --- | --- | --- |
| UE location | x-y coordination | UE |
| UE speed | v km/h | UE |
| Moving direction | Based on previous and current location | UE |
| Type of serving cell | Macro/Small | Serving cell |
| Type of target cell | Macro/Small | Serving cell |

Figure 12:
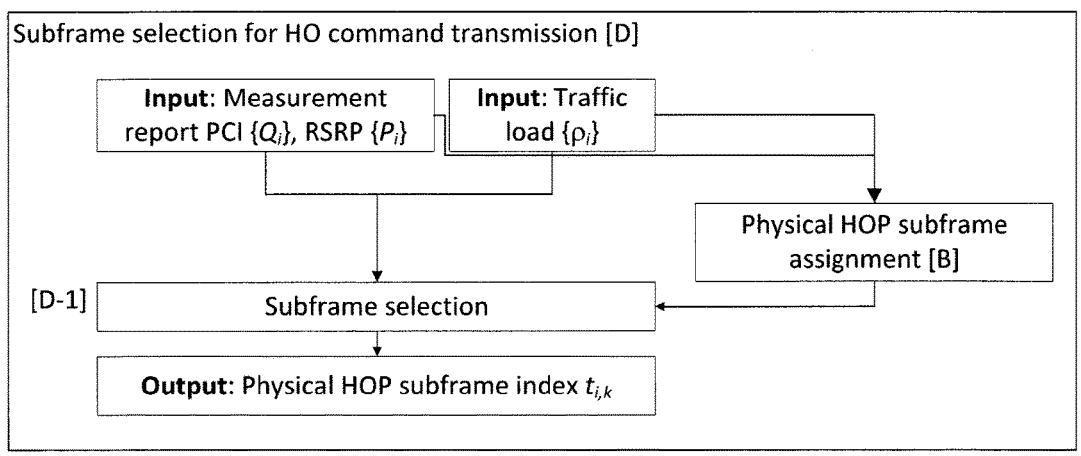
FIG. 12 shows an illustration of a subframe selection for HO command transmission model according to various embodiments.

In the following, a HOP subframe selection module for HO command transmission (which may be referred to as [D], like shown in illustration 1200 of FIG. 12) will be described.

In total there are 6 physical HOP subframes per one radio frame. The serving cell avoids to send any signal including HO command during its own physical HOP subframes. Therefore, the serving cell needs to select one physical HOP subframe from remaining physical HOP subframes.

The inputs to the HOP subframe selection module for HO command transmission [D] are PCIs and RSRPs from measurement report and traffic load exchanged via X2 link. The PCIs and traffic load information are input to HOP subframe assignment module [B] to obtain physical HOP subframe vectors. Then, the obtained physical HOP subframe vectors and the RSRP values are input to subframe selection module [D-1].

The information which can be used for subframe selection [D-1] may be as given in Table 4. The set of PCI values of the neighboring cells whose RSRP values are included in the measurement report is denoted by $C_i$.

TABLE 4

Input information to HOP subframe selection module [C].

| Information | Information Origin | Values |
| --- | --- | --- |
| RSRP of neighboring cells | Measurement report from UE | $P_j$, for $j \in C_i$ |
| Physical HOP subframe vector | HOP subframe assignment module [B] | $t_j(\rho_j, l_j)$, for $j \in C_i$ |
| Traffic load | X2 | $\rho_j \in [0, \ldots, 1]$, for $j \in C_i$ |

The general selection function of HOP subframe for UE k in cell i may be expressed as $$t_{i,k} = g(\{Q_j, P_j, \rho_j\}) \quad (9)$$

According to various embodiments, target cell avoidance (TCA) may be provided as follows: With high probability, the target cell produces the largest interference to the HO UE. To avoid such a huge interference, the physical HOP subframe of the target cell k is selected for the HO command transmission. The selection function of HOP subframe is expressed as $$g_{TCA}(\{Q_j, P_j, \rho_j\}) = \operatorname*{argmax}_t P_k t_{k,t}(\rho_k, l_k) \quad (10)$$

According to various embodiments, weighted largest interference avoidance (WLIA) may be provided as follows: With the assistance of the PCI list and the RSRP values in measurement report, the serving cell can calculate the aggregate interference on each HOP subframe. To maximize the SINR, the physical HOP subframe with the lowest interference is selected. Thus the selection function of HOP subframe is expressed as $$g_{WLIA}(\{Q_j, P_j, \rho_j\}) = \operatorname*{argmax}_t \sum_{j \in C_i} w_j P_j t_{j,t}(\rho_j, l_j) \quad (11)$$

The weight $w_j$ may be provided arbitrarily. One way is calculating it according to the exchanged traffic load. As shown in Table 1, the number of physical HOP subframes depends on the traffic load. For example if the traffic load of cell j satisfies $\bar{\rho}_m \leq j < \bar{\rho}_{m-1}$, in total m physical HOP subframe is assigned at most. However, if $\rho_j \approx \bar{\rho}_{m-1}$, some of the physical HOP subframes of cell j may contain downlink user transmission. Then the interference reduction during those physical HOP subframes cannot be expected. Therefore, we may set $w_j \approx 0$.

Figure 13:
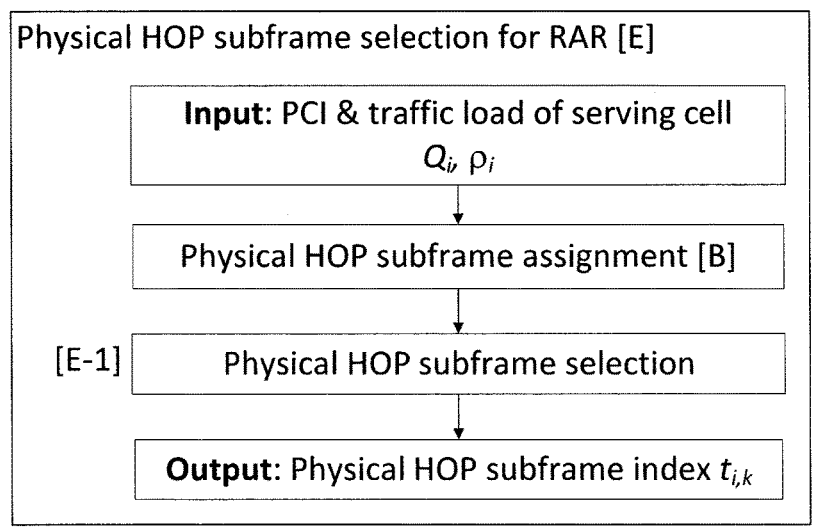
FIG. 13 shows an illustration of a physical HOP subframe selection module for RAR according to various embodiments.

In the following, HOP subframe selection module for random access response (which may be referred to as [E] like indicated in illustration 1300 of FIG. 13) will be described.

Once the HO UE sends the random access (RA) message to the target cell, the target cell replies with random access response (RAR). The only information the target cell can utilize for HOP subframe selection is the PCI of the serving cell i. Therefore, the target cell selects one of the physical HOP subframes of the serving cell i which can be obtained from PCI $Q_i$ to avoid the interference from the serving cell.

This module is located (in other words: may be provided; in other words: corresponding processing may be executed) at the target cell. The input to this module is PCI and traffic load of serving cell, i.e., $Q_i$ and $\rho_i$. The physical HOP subframe assignment module [B] provides the physical HOP subframe vector of the serving cell i. Then, physical HOP subframe selection module [E-1] selects one of the physical HOP subframe of the serving cell i.

In the following, explicit signaling of HOP subframe according to various embodiments will be described.

The serving cell may utilize the HOP subframes where neighboring cells may mute (or transmit at reduced power) and transmit HO command over the subframes for potentially better signal-to-interference plus noise ratio (SINR). It may therefore be desired by the serving cell to know the index of the subframe where the neighboring cells may mute. In addition to finding out the subframe index implicitly based on PCI, as discussed previously, the muting information may be exchanged based on explicit signaling over inter-cell communications (e.g. via X2 or MME interfaces). In current 3GPP standard, IE CHOICE ABS Information is defined to inform the ABS pattern of each cell to the neighboring cells.

Explicit indication of muting information may be desired when the neighboring cells have scheduled the muting of one or more subframes other than the HOP subframes inferred from PCI (e.g. for the purpose of protecting downlink signal for small cell UEs). Explicit indication of muting information is also useful when PCI assignment is not optimized for HO command protection (e.g. HOP subframes of the serving cell and the neighboring cells overlap). Furthermore, a cell may also mute a subset of PCI-based HOP subframes instead of every PCI-based HOP subframe. It is therefore beneficial to signal to other cells the exact HOP subframe that will be muted.

In the case when the muted subframe is different from the PCI-based HOP subframe, the neighboring cells may not need to mute the PCI-based HOP subframe, and the serving cell can use the muted subframe (other than the PCI-based HOP subframe) to send HO command with the information from explicit inter-cell signaling. Hence the neighboring cells need not dedicate additional subframes for HO command for more efficient resource usage. Such muting information may be determined by each cell autonomously. Alternatively, the cells may negotiate and exchange muting information cooperatively. The muting information can be exchanged on different time scales from highly dynamic exchange in the order of radio frame (10 ms) to semi static exchange where a fixed pattern is valid over multiple radio frames and is scheduled periodically.

The explicit signaling may include information such as index of the subframe where muting occurs within a radio frame and the schedule of muting. An example of such muting schedule is periodicity and validity when a cell schedules the muting of subframe to be periodic. The periodicity indicates the period over which muting is applied (for both HOP based and non-HOP based subframes), which can be measured by the time duration between two successive muted subframes for the cell. The validity indicates the number of periods where such muting repeats. When the number of occurrence of muting exceeds the validity, the muting schedule may expire.

In the following, UE grouping according to various embodiments will be described.

Using dedicated subframe for HO command transmission may impact operation of non-serving cells (in that they need to mute some subframes which would otherwise be used for data transmission). To minimize such impact, the frequency of muting should be reduced. One method to reduce the muting frequency is to limit the scope of muted subframes to only one or multiple classes of UEs. For example, high-speed UEs generally suffer HOF more than low-speed UEs, and the muted subframes can be used for HO command transmission to high-speed UEs only. For low-speed UEs, the serving cell may use normal subframes. Furthermore, UEs with similar trajectory (e.g. UEs on a train/bus with identical speed/direction) may be grouped to share the same muted subframe so that it can be used more efficiently.

In the following, context awareness according to various embodiments will be described.

The above described UE grouping may requires the network to know the UE context information such as UE position, speed, and travel direction/trajectory. Such UE-context information can be obtained by UE and/or the network. For the former, it may use additional sensors like global positioning system (GPS) to position itself, and sends the context information to the serving cell together with measurement report. The network may also sense the UE position based on the measurement report, which indicates the cells that can be detected by the UE, which should reside at the intersection of the cell coverages. With the dense deployment of small cells, the proximity-based positioning accuracy can be further improved. Based on the handover history of the UE as well as knowledge of cell location, the network is also able to infer the speed and trajectory of the UE.

In the following, UE procedure according to various embodiments will be described.

As the serving cell may need to wait for the next available subframe to send HO command, the latency between HO trigger and HO command transmission may increase. To ensure the HO command is received on time, the UE may trigger the HO process earlier by sending the measurement report to the serving cell earlier according to the serving cell's PCI. This gives the network sufficient time allowance to find the next available subframe and send the HO command on time.

The UE may declare RLF if the serving cell's signal quality falls below certain threshold. Such signal quality is measured by some reference signal transmitted by the cells. While the cells may mute certain subframes, they may still transmit the reference signals. Hence it is possible that the UE declares radio link failure and stops decoding even though it is able to decode the HO command successfully with reduced interference (due to muting). To avoid the situation where the UE stops decoding downlink signal based purely on RSRP, it is necessary to indicate to UE to continue decoding the HO command subframe. Such indication may be signaled to the UE explicitly. Alternatively, the UE may blindly decode each subframe after sending measurement report to the serving cell until it receives the HO command or until expiry of some timer. The timer duration can also be adaptive to UE-context information such as battery level.

According to various embodiments, a context-aware resource reservation strategy for handover failure (HOF) reduction in orthogonal resource-based wireless communication system may be provided. An example of orthogonal resource-based wireless communication system may be 3rd generation partnership project (3GPP) long-term evolution (LTE)/LTE-Advanced (LTE-A) networks. The strategy according to various embodiments may utilize the user/network-context information to reserve a specific orthogonal resource for handover (HO) procedure. A handover command protection (HOP) subframe may be provided as a specific orthogonal resource for HO procedure in 3GPP LTE/LTE-A networks. Each cell may be assigned to multiple physical HOP subframes according to the physical cell identity (PCI) and traffic load. Herein, the assignment may be performed in distributed manner, i.e., no overhead signaling may be required to execute the HOP subframe assignment. Once the physical HOP subframes are defined for all cells, each cell may try and avoid as much as possible allocating downlink user traffic to the assigned physical HOP subframes. By this, a HO user equipment (UE) can have high chance to use the HOP subframe which has the lowest interference. Concretely, during the HO, a serving cell selects one of the HOP subframes except for its own HOP subframe and sends a HO command to the HO UE. All neighboring cells, i.e., all potential target cells, may follow the same strategy. By doing this, the strong interference on physical downlink control channel (PDCCH), which is a main cause of HOF in LTE/LTE-A, can be mitigated. Here, since the subframe selection is carried out based on neighboring cells' PCIs and reference signal received power (RSRP) values reported by the HO UE at each cell, no additional signaling is required to select the proper HOP subframe. Furthermore, the proposed method is fully backward compatible and does not require to modify the current protocol in 3GPP standard. From the numerical results, it is verified that the proposed method can significantly reduce the HOF rate.

According to various embodiments, a UE/network-context information-assisted resource reservation strategy to reduce handover failure (HOF) rate may be provided.

According to various embodiments, a handover command protection (HOP) subframe for HO command transmission in 3GPP LTE/LTE-A networks may be provided.

Figure 9:
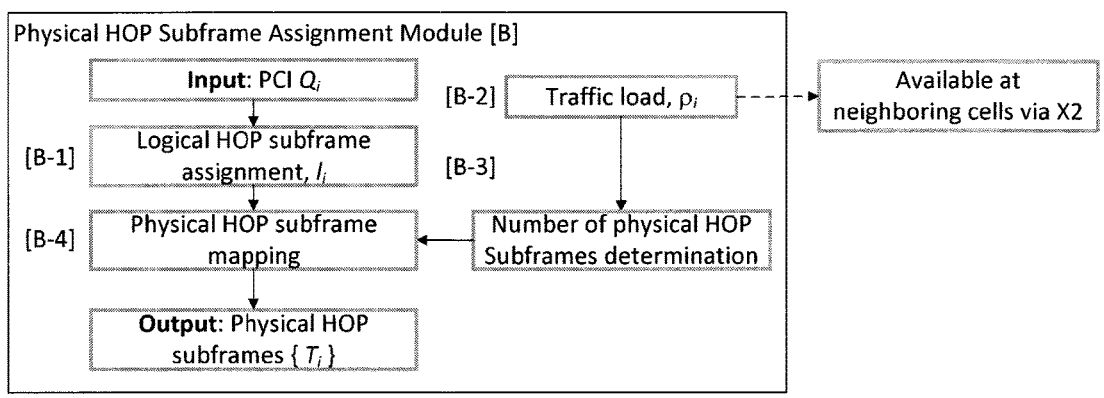
FIG. 9 shows an illustration of a physical HOP subframe assignment module according to various embodiments.

According to various embodiments, a physical HOP subframe assignment module (for example referred to as [B], and which may include modules [B-1], [B-2], [B-3], and [B-4] like described in FIG. 9) may be provided.

According to various embodiments, a module (for example referred to as [B-1]) to assign logical HOP subframe each cell based on its physical cell identity (PCI) (for example like described with reference to FIG. 9) may be provided.

According to various embodiments, a module (for example [B-2]) to monitor traffic load (for example like described with reference to FIG. 9) may be provided.

According to various embodiments, a module (for example [B-3]) to determine the number of physical HOP subframes based on traffic load information provided by the module [B-3] (for example like described with reference to FIG. 9) may be provided.

According to various embodiments, a module (for example [B-4]) to map logical HOP subframe to physical HOP subframes based on the number of physical HOP subframes obtained from the module [B-2] (for example like described with reference to FIG. 9) may be provided.

According to various embodiments, a module (for example [C-1]) to select the candidate list of target cells, which the UE needs to monitor, based on the physical HOP subframe assignment module [B] and UE-context information (for example like shown in Table 3, or in FIG. 11) may be provided.

According to various embodiments, a module (for example [D-1]) to select a subframe for HO command transmission according to the information provided by the module [B], measurement report, and traffic load information exchanged over X2 link (for example like described with reference to FIG. 12) may be provided.

According to various embodiments, a module (for example [E-1]) to select physical HOP subframe for random access response (RAR) message based on the traffic load information of the serving cell and its PCI (for example like described with reference to FIG. 13) may be provided.

According to various embodiments, UE grouping methods and UE grouping devices assisted by UE-context information (for example like described in Table 3) may be provided.

According to various embodiments, user profiling information, e.g., traveling pattern and routing information, to assist the HO may be provided.

It will be understood, that when reference to a "module" is made in the above description, both a method carrying out what is described in respect to the module, or a circuit configured to carry out what is described in respect to the module may be addressed.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication method comprising:
assigning, to each of a plurality of cells, a handover command protection subframe, each handover command protection subframe having a low priority for downlink user traffic allocation;
triggering, by a serving cell in the plurality of cells, a handover of a user equipment from the serving cell to a target cell in the plurality of cells; and
transmitting, from the serving cell, a handover command for the handover to the user equipment based on one of the assigned handover command protection subframes of the plurality of cells excluding the serving cell.

2. The radio communication method of claim 1,
wherein the plurality of cells comprises the serving cell and a plurality of neighboring cells of the serving cell, the neighboring cells including the target cell.

3. The radio communication method of claim 1,
wherein the assigned handover command protection subframes of the plurality of cells are each an assigned logical handover command protection subframe.

4. The radio communication method of claim 3, further comprising:
mapping for each of the plurality of cells, the assigned logical handover command protection subframe of the cell to at least one physical handover command protection subframes.

5. The radio communication method of claim 1,
wherein said one of the assigned handover command protection subframes is determined based on at least one of a measurement report, measured traffic load information, or traffic load information exchanged over an X2 link.

6. The radio communication method of claim 1,
wherein the handover command protection subframe is assigned to the cell based on traffic load information of the cell and its physical cell identity.

7. The radio communication method of claim 1, further comprising:
grouping a plurality of user equipments based on user equipment context information.

8. The radio communication method of claim 1, further comprising:
determining user profiling information;
wherein the handover command is transmitted to the user equipment further based on the user profiling information.

9. The radio communication method of claim 8,
wherein the user profiling information comprises at least one of a traveling pattern of the user or routing information of the user.

10. A radio communication system comprising:
an assignment circuit configured to assign, to each of a plurality of cells, a handover command protection subframe, each handover command protection subframe having a low priority for downlink user traffic allocation; and a handover circuit of a serving cell in the plurality of cells configured to:

trigger a handover of a user equipment from the serving cell to a target cell in the plurality of cells; and transmit a handover command for the handover to the user equipment based on one of the assigned handover command protection subframes of the plurality of cells excluding the serving cell.

11. The radio communication system of claim 10, wherein the plurality of cells comprises the serving cell and a plurality of neighboring cells of the serving cell, the neighboring cells including the target cell.

12. The radio communication system of claim 10, wherein the assigned handover command protection subframes of the plurality of cells are each an assigned logical handover command protection subframe.

13. The radio communication system of claim 12, wherein the assignment circuit is configured to map, for each of the plurality of cells, the assigned logical handover command protection subframe of the cell to at least one physical handover command protection subframe.

14. The radio communication system of claim 10, wherein said one of the assigned handover command protection subframes is determined based on at least one of a measurement report, measured traffic load information, or traffic load information exchanged over an X2 link.

15. The radio communication system of claim 10, wherein the assignment circuit is configured to assign the handover command protection subframe to the cell based on traffic load information of the cell and its physical cell identity.

16. The radio communication system of claim 10, further comprising:

a grouping circuit configured to group a plurality of user equipments based on user equipment context information.

17. The radio communication system of claim 10, further comprising:

a profiling circuit configured to determine user profiling information;

wherein handover circuit is further configured to transmit the handover command to the user equipment based on the user profiling information.

18. The radio communication system of claim 17, wherein the user profiling information comprises at least one of a traveling pattern of the user or routing information of the user.

* * * * *